H. G. REIST.
DYNAMO ELECTRIC MACHINE.
APPLICATION FILED FEB. 29, 1908.
925,132.
Patented June 15, 1909.
4 SHEETS—SHEET 4.
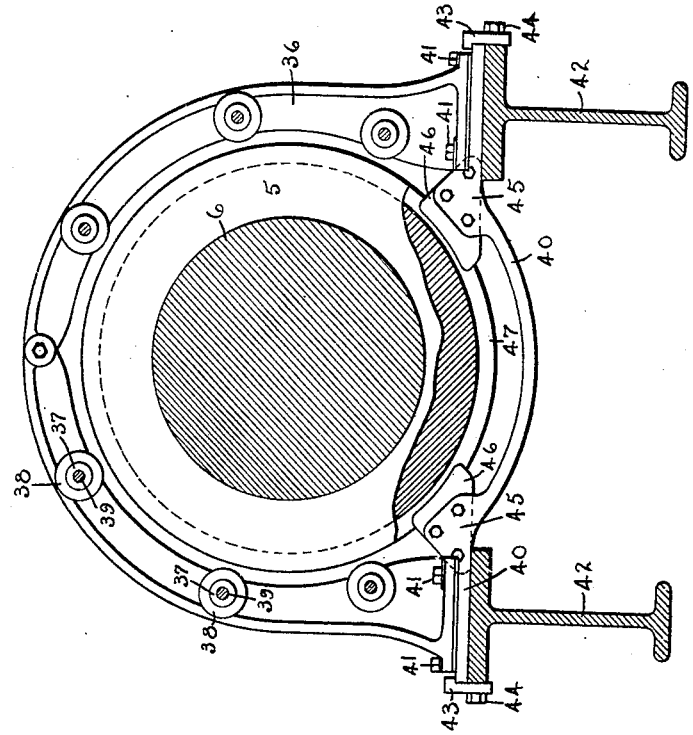
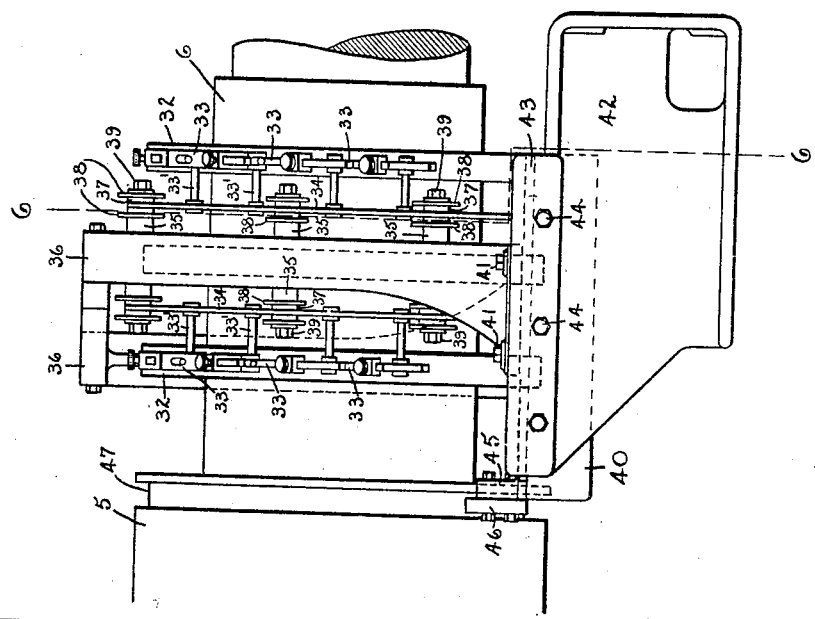
WITNESSES:
Lester H. Palmer.
J. Ellis Glen.
INVENTOR
HENRY G. REIST.
BY Albert G. Davis
ATT'Y.

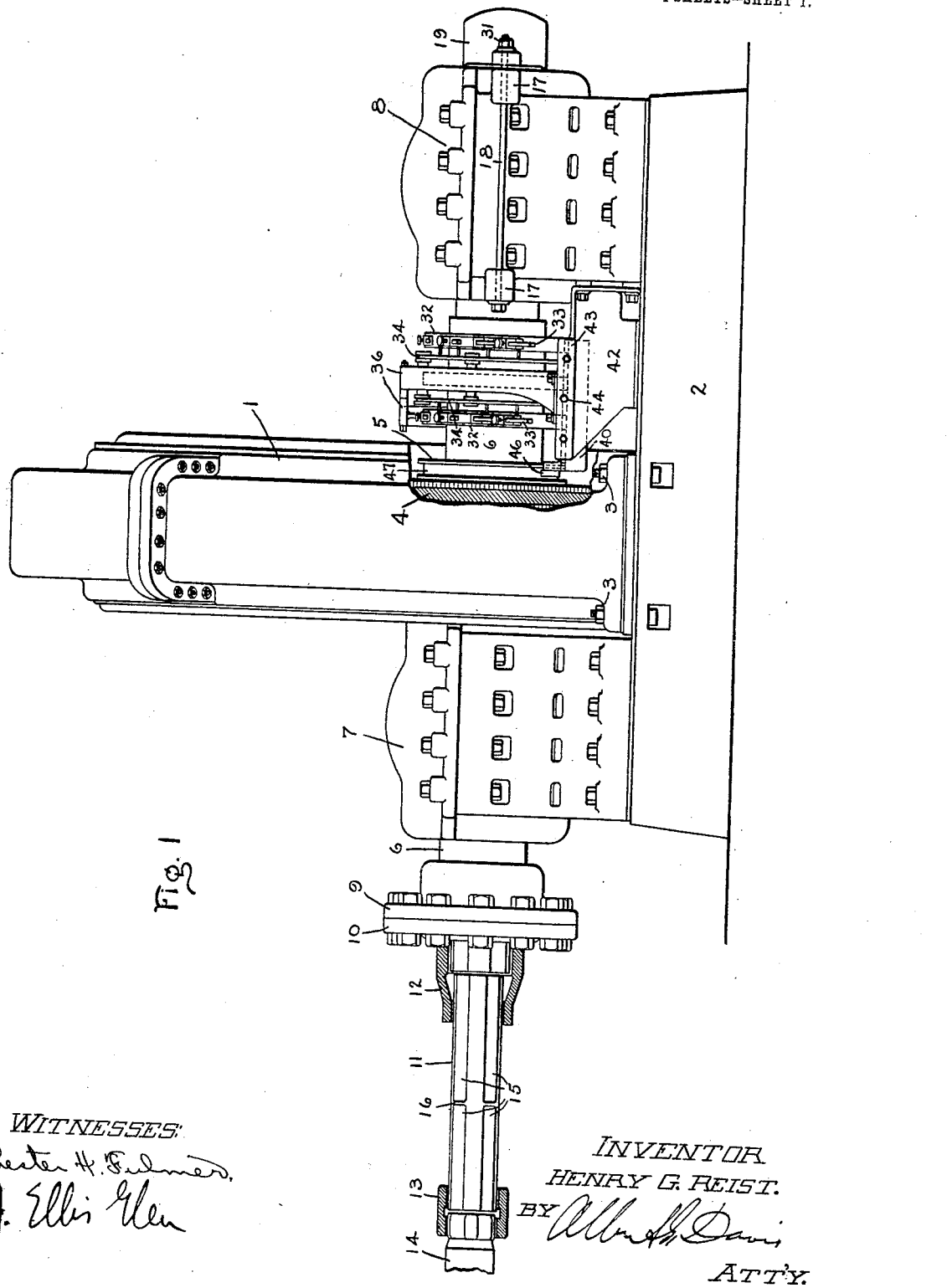

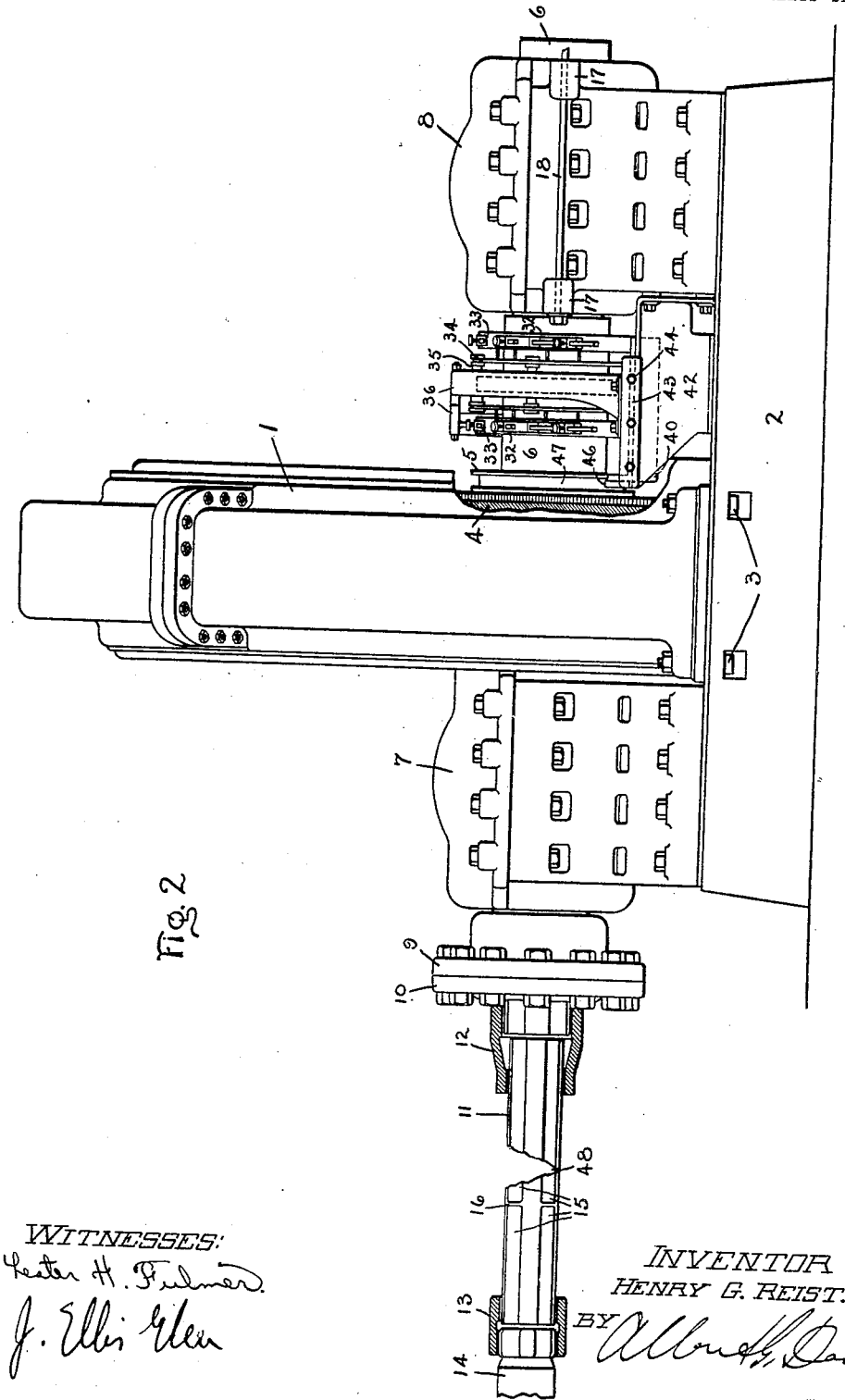

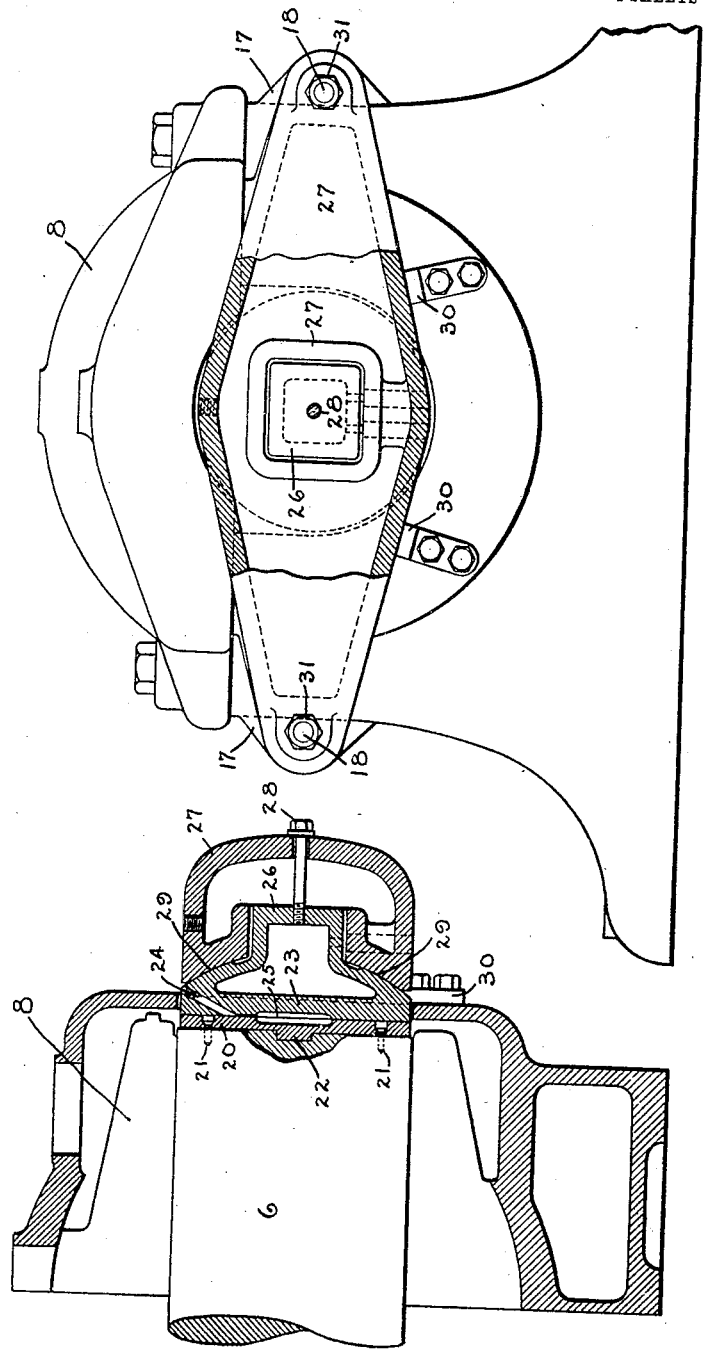

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

No. 925,132.     Specification of Letters Patent.     Patented June 15, 1909.

Application filed February 29, 1908. Serial No. 418,489.

*To all whom it may concern:*

Be it known that I, HENRY G. REIST, a citizen of the United States, residing at Schenectady, in the county of Schenectady and State of New York, have invented certain new and useful Improvements in Dynamo-Electric Machines, of which the following is a specification.

My invention relates to dynamo-electric machines and more particularly to such machines when used for driving the rolls of rolling mills and the like.

When dynamo-electric machines, or steam or gas engines, are provided for driving rolls, breakable spindles or shafts are placed between the motors and rolls. These spindles break when the rolls are overloaded to avoid the breakage of the expensive rolls. The breakage of the spindle may cause a severe end thrust on the shaft of the driving machine in case of an irregular fracture. This is caused by the stoppage of the rolls, the continued rotation of the dynamo-electric machine and the tendency of the surfaces of the fracture to clear each other. Heretofore no means have been provided to take care of this end thrust, except by making a heavy pedestal for the end of the shaft near the rolls which would receive the thrust, transmit it to the base of the driving machine and move the machine from its foundations. Often the dynamo-electric machine or engine was damaged.

The object of my invention is to overcome these disadvantages when a dynamo-electric machine is employed for driving the rolls or similar machines and to protect the machine from any material damage due to the described end thrust. To this end, I provide the dynamo-electric machine with a rotatable member which can move in an axial direction when subjected to a severe end thrust without injuring any part of the dynamo-electric machine.

When the dynamo-electric machine is used for driving rolls there is at all times an end thrust upon the shaft of the dynamo-electric machine. This normal end thrust however, never exceeds a certain definite amount which may be estimated or determined by experiment, and an end thrust bearing is provided which will withstand a thrust of this amount. If the thrust is greater than this, due to the breaking of the spindle or other similar cause, the fastening means of the end thrust bearing are designed so as to break and allow the rotatable member to move axially without injuring any parts other than these fastening means.

Other features of novelty which characterize my invention are pointed out with particularity in the claims annexed to and forming a part of this specification.

For a better understanding of my invention, however, reference may be had to the following description taken in connection with the accompanying drawing in which I have described one embodiment of my invention.

In the drawing, Figure 1 is an elevation of a dynamo-electric machine, partly broken away to show some details of construction, the parts being in their normal or operating position; Fig. 2 is a view similar to Fig. 1, the armature having moved due to a severe end thrust exerted upon it; Fig. 3 is a section through an end thrust bearing provided for holding the armature in its normal position; Fig. 4 is an end view of the bearing of Fig. 3 partly broken away and in section; Fig. 5 is an enlarged view of the current collecting device of my dynamo-electric machine, and Fig. 6 is a section on the line 6—6 of Fig. 5.

I have chosen an induction motor having a rotor with collector rings and starting resistance external thereto, for the illustration of my invention, but it is evident to those skilled in the art that any form of dynamo-electric machine may be used. The stator 1 of the induction motor is fastened to the base 2 by means of bolts 3. The rotor 4 has a spider 5 which is mounted upon a shaft 6. The shaft 6 is journaled in bearings 7 and 8 which are bolted to the base 2. At one end of the shaft is a coupling 9 to which is bolted another coupling 10. The breakable spindle or shaft 11 is connected to the coupling 10 by means of a coupling box 12 which is shown in section. Another coupling box 13 connects the driving spindle 11 with the driven shaft 14 of the rolls. The coupling boxes 12 and 13 are loosely mounted in place so that the spindle may be inclined at an angle to the axis of the shaft 6, without producing any strain on the couplings. In order to prevent these coupling boxes from moving along the spindle, spreader blocks, made of wood or other suitable material, are inserted in the grooves 15 and butt against the central cylindrical portion 16 of the spindle 11. One or two bearings (not shown) are provided for the spindle, and are usually spring supported in order that they may follow the inclinations of the spindle as it drives the rolls. The construction and the method of supporting such spindles for rolling mills is well known in the art.

On the bearing 8, lugs 17 are cast through which bolts 18 pass for holding the end thrust bearing 19 in place. This end thrust bearing presses against the end of the shaft to hold the rotor or armature in its normal position in the field. I prefer to have these bearings exert about two hundred tons pressure when the motor is of large output, that is, from say two thousand to six thousand horse-power. Referring now particularly to Figs. 3 and 4, the bearing plate 20, which is made of a brass alloy, is fastened to the end of the shaft 6 by means of screws 21 and has a tongue 22 which fits a corresponding groove extending across the end of the shaft. Against this plate 20 is pressed the thrust bearing ball 23. This ball has a passage 24 which leads from the top of the part 23 to the surface which is in contact with the plate 20. Indentations are formed both in this surface and in the plate and these indentations form a pocket 25 for the lubricating material inserted between the rubbing surfaces by means of the passage 24. The bearing ball has a square shaped portion 26 which enters a square aperture in the bearing bracket 27 kept from turning thereby, and is secured thereto by means of the bolt 28. The surface 29 of the ball is spherical and fits a similar shaped surface of the bearing bracket 27. By making these surfaces spherical the bearing ball tends to adjust its position in the seat formed in the bracket, and consequently the flat surfaces of the ball and that of the plate 20 are always in surface contact. The bearing bracket 27 is diamond shaped as seen in Fig. 4 and its weight is supported by the brackets 30. The bolts 18 pass through holes in the bearing bracket 27, and the nuts 31 are screwed upon the ends of the bolts holding the bearing bracket in place.

Figs. 5 and 6 show in detail the construction of the current collecting device which is arranged to move with the armature in case the armature is subjected to a heavy end thrust. Collector rings 32 are mounted on the shaft in any usual or preferred manner. Brushes 33 collect the current from these rings and are supported on the brush holder studs 33' which are screwed into the cross connections 34. The cross connections are mounted on studs 35 extending from the stands 36. and are insulated therefrom by means of bushings 37 and the washers 38. The bolts 39 screwed into the ends of the studs 35 hold the cross connections in place. The stands 36 are fastened to a base plate 40 by means of bolts 41. The base plate 40 is supported on, but is not fastened to, I-beams 42 which I have shown as fastened to the pillow block of the bearing 8. These beams may be supported from the base 2 of the machine or in any other suitable manner. Guide brackets 43 are fastened to the I-beams by means of bolts 44. Lugs 45 are cast upon the base plate, and plates 46 are bolted thereto. The plates 46 fit rather loosely in a groove 47 formed in the spider 5. This groove, however, may be formed in a separate collar mounted on the shaft or may be formed in the shaft itself, and further the collar may be fastened to the shaft on the side of the collector rings away from the armature. When the groove is formed in the spider as shown in Fig. 5, the leads from the collector rings are carried through holes in the spider (not shown) so as not to interfere with the plates 46.

Under normal conditions of operation the relation of parts of my dynamo-electric machine are as shown in Fig. 1 of the drawing. In case the rolls or other apparatus which is being driven by the dynamo-electric machine becomes overloaded and the breakable coupling is fractured, the rolls stop but the driving machine continues to turn causing a heavy end thrust on the shaft of the machine as the irregular surfaces of the fracture tend to clear each other. The parts then assume the position shown in Fig. 2, the fractured coupling being shown at 48. It has been found by experiment that the fracture of a coupling which is of sufficient cross-section to transmit from two to six thousand horse-power (normal), will not cause a movement of the rotor of the driving machine of more than eight inches, and consequently the parts are arranged to allow for this amount of movement. When the end thrust comes upon the bearing 19, the bolts 18 being the weakest part of this end thrust bearing break, permitting the end thrust bearing to fall out of the way and allowing the end of the shaft 6 to project beyond the end of the bearing 8. These bolts may have their heads sheared off, or the threads, upon which the nut 31 is screwed, stripped, or its tensile strength may be made low and then it would break between the lugs 17. In any case these bolts are calculated to withstand an end thrust of about two hundred tons for machines of this size. As the rotor moves over, the lugs 46, attached to the base plate 40, are guided by the groove 47 and the whole current collecting device is moved over with the rotor. Since the stands 36 are fastened to this base plate, the brushes are always in contact with the collector rings. The base plate 40 is guided by the guide brackets 43, and therefore the parts are always centered. If the current collecting device did not move with the rotor, the collector rings would be damaged, due to the arcing at the brushes when they left the rings.

I have illustrated my invention in connection with an induction motor driving a roll, but it is evident that it may be applied to any dynamo-electric machine driving a device which is coupled to the machine by means of a spindle or shaft which is liable to be fractured, and I desire it to be understood that my invention is not limited to the particular construction shown and described, and I aim in the appended claims to cover all modifications which do not depart from the spirit of my invention.

What I claim as new and desire to secure by Letters Patent of the United States, is,

1. In combination with a driven device, a dynamo-electric machine having a rotatable member mounted on a shaft arranged to be moved axially in its bearings, and a breakable spindle between the dynamo-electric machine and the driven device, whereby when the shaft is subjected to a severe end thrust due to the breaking of the spindle, it will move axially in its bearings without injuring the parts of the dynamo-electric machine.

2. In combination with a driven device, a dynamo-electric machine having a rotatable member mounted on a shaft arranged to be movable axially in its bearings, a breakable spindle between said shaft and the driven device, and means for preventing said shaft from moving axially under normal conditions.

3. In combination with a driven device, a dynamo-electric machine having a rotatable member mounted on a shaft arranged to be moved axially in its bearings, a breakable spindle between said shaft and the driven device, and breakable means for holding said shaft in its normal position until subjected to a severe end thrust.

4. In combination with a driven device, a dynamo-electric machine having a rotatable member mounted on a shaft arranged to be moved axially in its bearings, a breakable spindle between said shaft and the driven device, and breakable means engaging the end of said shaft for holding said shaft in its normal position until subjected to a severe end thrust.

5. In combination with a driven device, a dynamo-electric machine having a rotatable member mounted on a shaft arranged to move axially in its bearings, an end thrust bearing engaging the end of said shaft and arranged to hold said shaft in its normal position, and a breakable spindle between said shaft and said device, whereby when the shaft is subjected to a severe end thrust due to the breaking of the spindle, it will move axially in its bearings without injuring the parts of the dynamo-electric machine.

6. In combination with a driven device, a dynamo-electric machine comprising a rotatable member mounted on a shaft arranged to move axially in its bearings, a breakable spindle between said shaft and said device, and means engaging the end of the shaft for holding said shaft in its normal position until subjected to a severe end thrust, said means including a bearing ball in frictional engagement with the end of said shaft, a bearing bracket supporting said bearing ball and preventing its rotation, and breakable means for fastening said bracket in place.

7. In combination with a driven device, a dynamo-electric machine comprising a rotatable member mounted on a shaft, said shaft being supported in bearings and arranged to move axially therein, a breakable spindle between said shaft and said device, and an end thrust bearing including a bearing ball in frictional engagement with the end of said shaft, a bearing bracket supporting said bearing ball and preventing its rotation, said bracket being fastened to one of the shaft bearings by means of bolts, thereby holding said rotatable member in its normal position with respect to said stationary member until said shaft is subjected to a severe end thrust which breaks said bolts.

8. In combination with a driven device, a dynamo-electric machine having a rotatable member mounted on a shaft, bearings in which said shaft is journaled, said shaft being movable in an axial direction in said bearings, an end thrust bearing engaging the end of said shaft, said end thrust bearing being fastened to one of said shaft bearings by means of bolts and arranged to hold said shaft in its normal position until said shaft is subjected to a severe end thrust whereby said bolts are broken, and a breakable spindle between said shaft and said device.

9. In combination with a driven device, a dynamo-electric machine comprising a rotatable member mounted on a shaft arranged to move axially in its bearings, a current collecting device arranged to be axially movable with said shaft, and a breakable spindle between said shaft and said driven device, whereby when the shaft is subjected to a severe end thrust due to the breaking of the spindle, it will move axially in its bearings without injuring the parts of the dynamo-electric machine.

10. The combination with a driven device, of a dynamo-electric machine comprising a rotatable member mounted on a shaft, said shaft being movable in an axial direction in its bearings, a current collecting device, means coöperating with said current collecting device so arranged that said device is axially movable with said shaft, and a breakable spindle between said shaft and said device, whereby when the shaft is subjected to a severe end thrust due to the breaking of the spindle, it will move axially in its bearings without injuring the parts of the dynamo-electric machine.

11. The combination with a dynamo-electric machine comprising a rotatable member mounted on a shaft, collector rings also mounted on the shaft, a current collecting device collecting current from said rings, of a plate to which said device is fastened having lugs engaging a groove portion on said shaft whereby the current collecting device can move in an axial direction with the shaft.

12. The combination with a dynamo-electric machine comprising a rotatable member mounted on a shaft, collector rings also mounted on the shaft, a current collecting device collecting current from said rings, of a plate to which said device is fastened having lugs engaging a groove concentric with the shaft, and guide brackets engaging said plate so that the device can move in an axial direction with the shaft.

13. In combination with a driven device, a dynamo-electric machine having a rotatable member mounted on a shaft arranged to be moved axially in its bearings, a current collecting device, means coöperating with said current collecting device so arranged that said device is movable in an axial direction with said shaft, means for holding said shaft in its normal position, and a breakable spindle between said shaft and said device, whereby when the shaft is subjected to a severe end thrust due to the breaking of the spindle, it will move axially in its bearings without injuring the parts of the dynamo-electric machine.

14. In combination with a driven device, a dynamo-electric machine comprising a rotatable member mounted on a shaft arranged to be moved axially in its bearings, a breakable spindle between said shaft and the driven device, a current collecting device, means coöperating with said current collecting device so arranged that said device is movable in an axial direction with said shaft, and breakable means for holding said shaft in its normal position until subjected to a severe end thrust.

15. In combination with a driven device, a dynamo-electric machine comprising a rotatable member mounted on a shaft arranged to move axially in its bearings, collector rings mounted upon said shaft, a current collecting device having brushes in engagement with said rings, means coöperating with said current collecting device so arranged that said device is movable with said shaft, an end thrust bearing engaging the end of said shaft and arranged to hold said shaft in its normal position, and a breakable spindle between said shaft and said driven device, whereby when the shaft is subjected to a severe end thrust due to the breaking of the spindle, it will move axially in its bearings without injuring the parts of the dynamo-electric machine.

In witness whereof, I have hereunto set my hand this 27th day of February, 1908.

HENRY G. REIST.

Witnesses:
 BENJAMIN B. HULL,
 HELEN ORFORD.